March 29, 1932. P. ROSSET 1,851,213

SAFETY SCREW WITH TIGHTENING PRESSURE

Filed Sept. 24, 1929

Inventor
Paul Rosset
By B. Singer,
atty.

Patented Mar. 29, 1932

1,851,213

UNITED STATES PATENT OFFICE

PAUL ROSSET, OF LAUSANNE, SWITZERLAND

SAFETY SCREW WITH TIGHTENING PRESSURE

Application filed September 24, 1929, Serial No. 394,885, and in Switzerland October 1, 1928.

The invention refers to a safety nut which can also be used as a lock-nut.

The novelty of the invention consists in the fact that a ring, tapped and slit, is fitted into an annular groove provided at the bottom face of the nut in such a way that it exceeds the groove, the ring being provided, near the slit, with a sliding way for a pin fitted between the groove and the ring, this way straying progressively from the slit, from the annular groove, all those devices being assembled in such a way that a safety nut is obtained when the elastic ring is placed in the annular groove of the body of the nut, with the slit preceding the sliding way with regard to the direction of fastening, while, by placing the ring in such a way that the slit is behind the sliding way, always with regard to the direction of fastening, a lock-nut is obtained, which can be unscrewed only by destroying the thread of the bolt, unless employing a joining device which allows the simultaneous unscrewing of the body of the nut and the ring.

The annexed drawings, given for example, show several forms of construction of the invention.

The right half of Fig. 1 shows a view in elevation and the left half shows a section through the whole of the nut.

The Figs. 5 to 10 show, on a different scale, two other forms of construction of the joining device of the body of the nut with the ring.

Figure 5:
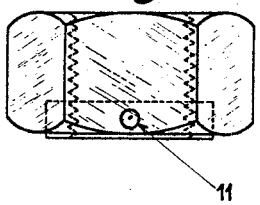
Figure 6:
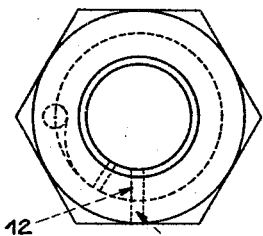

Fig. 5 is an elevation and Fig. 6 a plane view of a nut provided with a joining device by radial split-pin.

The Figs. 7 to 10 show another form of construction of a joining device.

Figure 7:
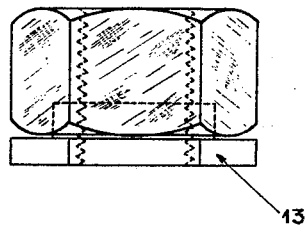
Figures 8, 9:
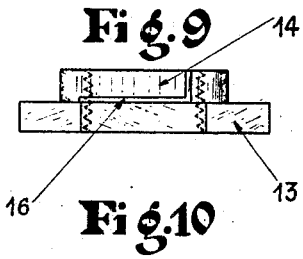

Fig. 7 is an elevation and Fig. 8 a plan of the whole nut.

Figure 10:
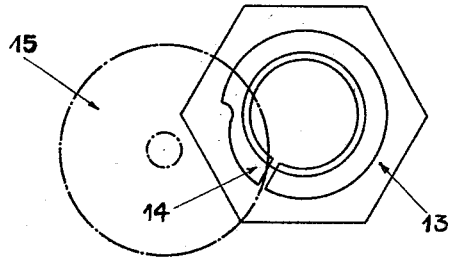

Fig. 9 is an elevation of the ring and Fig. 10 a plan of the elastic ring.

In the form of construction showed in Figs. 1 to 4, the safety nut consists in a body properly so called 1, the bottom of which is provided with an annular groove in which the ring 2 is fitted, this ring being threaded and slit in order to become elastic. The threading of the ring is the same as that of the body of the nut. On one part of the cylindrical face of the ring, a sliding way 3 is fitted, formed, the bottom of which is eccentric and extends progressively from the inner periphery of the annular groove of the body of the nut, from a point near the slit to the end of the sliding way. The height of the ring slightly exceeds the depth of the groove in which it is fitted, so that the ring projects slightly beyond the inner face of the nut.

A locking pin 4 is fitted in the body of the nut, overstriding the latter and the sliding way. The slit 5 mentioned above divides the ring 2, making it thus elastic. It is placed quite near the beginning of the sliding way 3.

Figure 1:
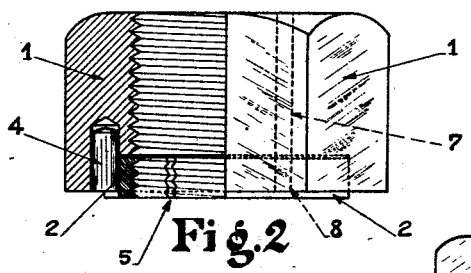
Figure 2:
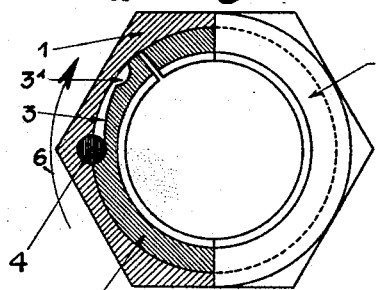
Fig. 2 shows on the right side, the plan of the nut seen from the top and on the left side, a section according to the line I of Fig. 1 with the ring placed in the position of a safety nut.

The nut can be used either as a safety nut or as a lock-nut according to whether the ring 2 is placed in the annular groove of the body of the nut 1, with the slit 5 before or behind the sliding way 3, with regard to the direction of tightening showed in Fig. 2 by the arrow 6.

In the first case shown in Fig. 2, the ring 2 is placed in the groove of the body of the nut with the slit 5 in front of the sliding way 3, with regard to the direction of rotation of the nut shown by the arrow 6. After the opposing face of the ring 2, while screwing, comes next to the bottom surface of the object which is to be fastened, the body 1 of the screw goes on screwing in the direction of the arrow 6 and the pin 4 moves forward on the sliding way 3 until it reaches the end of the ring 2, quite near the slit 5. The pressure exerted by the pin 4 on that end of the ring, engages said end with the thread of the bolt and also locks the ring 2 to the body of the nut. The nut is thus screwed on to the bolt and can by no means get casually unscrewed. The ring 2 acts in some degree like an elastic washer (ring of Grower) with the difference that in the present case, the fastening is done laterally. This lateral pressure being done in full, produces a complete fixation of the nut which cannot be unlocked.

In unlocking the nut 1 with a nut-key, in the direction opposite to that of the arrow 6, the body of the nut 1 turns round the ring 2 and the pin 4 comes back on to the sliding way, to its initial position in the deepest end portion thereof, and thereafter draws the ring 2 with it and hence unfastens the whole nut.

To use the nut as a lock-nut, the position of the ring 2 is reverse in the annular groove of the body 1, that is to say the ring 2 is put in such a way that the sliding way will be in front of the slit 5 when the nut is viewed as before, in the direction of the arrow 6.

The ring 2 can easily be taken off in screwing it to a bolt, for instance at the height of one thread and by hitting slightly against it in order to release it.

In screwing, the ring 2 is drawn along as described above, the pin 4 tightens the ring 2 on one side against the threads of the bolt and on the other side against the body 1 of the nut, the nut thus tightened can be no longer unscrewed. In unscrewing by means of a wrench in the direction of the arrow 6' of Fig. 3, the body 1 as well as the pin 4 fitted in it, will turn in the same direction, thus the pin will come to the sliding way 3 of the ring 2 in pressing progressively on the end of the ring 2 and in tightening so much the more strongly on the threading of the bolt, that the unfastening stress of the wrench will be exerted on the nut. Unfastening will then be impossible and the nut can be taken off only by destroying the thread.

In order to secure the degree of tightening of this device, a stop-recess can be provided at the end of the sliding way and near the slit 5, this recess keeps back the pin 4 in the tightened position of the nut.

For the same purpose, the sliding way can be provided with one or more recesses 3', so that when there is a small play between the nut and the bolt or when the fastening cannot be carried out until the last recess, the pin 4 can be held back by one of these recesses.

In order to permit the possibility of unfastening the nut and the ring when the latter is placed in the position of a lock-nut, without destroying the thread of the bolt, a joining device is to be provided allowing the joining of the ring with the body of the screw, in order to unscrew them together.

Figure 3:
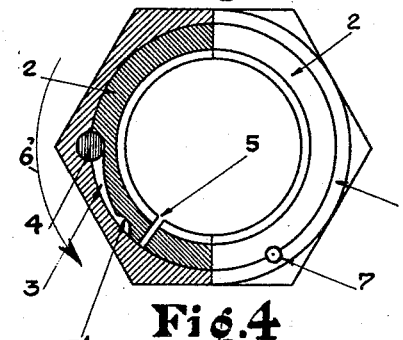
Fig. 3 shows on the right side the plan of the nut seen from the bottom and on the left side a section similar to that of Fig. 2 with the ring placed in the position of a lock-nut.
Figure 4:
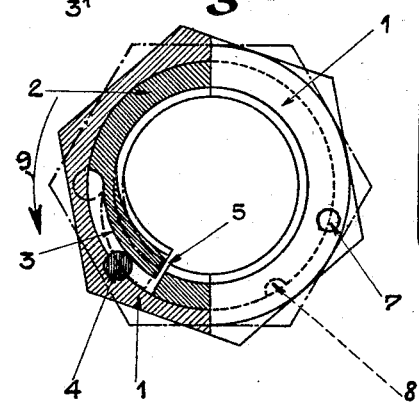
Fig. 4 is a draught showing the nut in an intermediate position, the right half of it being the plan seen from the top and the left half, a ring similar to that of Fig. 3.

A first form of construction of such a device is shown in Figs. 3 and 4.

At the same distance of the centre to the pin 4 and parallel to the latter, holes 7 and 8 are bored through and through; for instance at an angle of 120° or 180° with the pin 4,
holes which go through the body of the screw 1 and the ring 2, passing in the part of the annular groove half through the ring 2 and half through the body of the nut. In Fig. 4, the blocked nut is shown in mixed lines. In this position, the hole 7 of the body 1 corresponds with the hole 8 of the ring 2. When, for some reason, in case of trepidations or untimely unscrewing, the body of the screw unfastens in the direction of the arrow 9, the pin 4 gets up on the sliding way 3 and strongly fastens the free end of the ring against the thread of the bolt, as shown in an intermediate position of Fig. 4, in full lines. When the nut is to be unfastened, the joining device is put to work. For this purpose, the nut 1 must first be brought back in its blocked position drawn in dotted lines, in order that the hole 7 corresponds to the hole 8 of the ring. In this position, shown in Fig. 3, a pin 10 is introduced into the holes 7 and 8 and the two devices 1 and 2 are thus joined. Now the ring can be unfastened by unscrewing the nut with a wrench, in the opposite direction of the arrow 9 and the nut 1 may be taken off with its inner ring 2 without damaging the threads of the bolt or of the nut.

The holes 7 and 8, instead of being axial, can be bored in the radial direction, as shown in Figs. 5 and 6. Sufficient that this boring should pass through the body of the screw and the ring in their initial positions. In this form of construction, the holes 11 and 12 have to receive the joining-pin which enables them to join and to unfasten them together in the same way as described in the precedent form of construction.

Instead of the pin 10, a screw-nail can be used. In this case, the tapping must pass through the holes 7 and 8, respectively, 11 and 12. The length of the screw-nail can be equal to the length of the two holes 7 and 8 or only a part of those, so that when joining the two devices, there is but to screw the pin into the ring.

The Figs. 7 to 10 show another form of construction of the joining device, based on the form given to the elastic ring. The projecting part of the ring exceeding the bottom face of the nut can have the shape of a hexagon bridle or washer 13, of the same dimensions as the hexagon nut.

In order to give the necessary elasticity to the part of the ring drawn in the body of the nut, in order that the pin 4 can work efficaciously when unscrewing, in pressing the ring against the thread of the bolt, the part 14, bearing the sliding way, is separated from the bottom of the ring, which can be very easily obtained by means of a shim 15, shown in Fig. 10. The slit 16 (Fig. 9) thus obtained, gives the part 14 the necessary elasticity.

To unfasten the nut, the body of the nut will be blocked as for the precedent form of construction, until it is brought back to its initial position, in which the hexagon nut corresponds to that of the ring. The wrench is applied simultaneously on both parts and the whole of the nut and its ring can be easily unfastened.

Having now particularly described and ascertained the nature of my invention and in what manner the same is to be performed, I declare that what I claim is:

1. A nut having a threaded bore and an annular groove on its inner side concentric with the bore and a stop recess at one side of said groove in combination with a split ring revolubly fitted in said groove, having an interior thread corresponding with that of the nut and also having in its outer periphery a sliding way spaced from the split portion of the ring and the bottom of which is eccentric with the ring so that said sliding way deepens in one direction and a pin fitted in said recess of the nut and in said sliding way, so that when the nut is turned against resistance of the ring the end of said ring provided with said sliding way is moved by the camming action of the pin and the eccentric bottom of the sliding way radially inwardly and hence caused to lock the ring and the nut on a bolt on which the nut is screwed.

2. A nut split ring and pin as claimed in claim 1, in which the split ring is provided with a recess located at a point in the sliding way to receive the pin after partial annular movement between the nut and the ring.

3. A nut ring and pin as claimed in claim 1, in which the depth of the annular groove in the nut is less than that of the ring, so that the ring projects slightly beyond the inner face of the nut to frictionally engage an opposing surface when the nut is used.

In witness whereof I affix my signature.

PAUL ROSSET.